US012783160B2

(12) United States Patent
(10) Patent No.: US 12,783,160 B2

Gang

(45) Date of Patent: Nov. 3, 2026

(54) METHOD OF MANAGING METADATA AND APPARATUS, COMPUTER DEVICE, AND READABLE STORAGE MEDIUM

(71) Applicant: SUZHOU METABRAIN INTELLIGENT TECHNOLOGY CO.,LTD., Jiangsu (CN)

(72) Inventor: Yazhou Gang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 119 days.

(21) Appl. No.: 18/879,569

(22) PCT Filed: Mar. 17, 2023

(86) PCT No.: PCT/CN2023/082024

§ 371 (c)(1),
(2) Date: Dec. 27, 2024

(87) PCT Pub. No.: WO2024/093090

PCT Pub. Date: May 10, 2024

(65) Prior Publication Data

US 2026/0259675 A1 Sep. 3, 2026

(30) Foreign Application Priority Data

Nov. 4, 2022 (CN) ......................... 202211374504.0

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
(Continued)

(56) References Cited

U.S. PATENT DOCUMENTS 10,216,446 B2 2/2019 Lan et al.
2018/0090184 A1* 3/2018 Lee ........................ G11C 29/20
(Continued)

FOREIGN PATENT DOCUMENTS

CN 107122130 A 9/2017
CN 111427855 A 7/2020
(Continued)

OTHER PUBLICATIONS

CN113535708, SuZhou Inspur Intelligent Tech, Machine Translation to English; PD: Oct. 22, 2021. (Year: 2021).*
(Continued)

*Primary Examiner* — Than Nguyen
(74) *Attorney, Agent, or Firm* — Merchant & Gould P.C.; Daniel J. Pereira

(57) ABSTRACT

The present disclosure discloses a method of managing metadata and apparatus, a computer device, and a non-volatile readable storage medium. The method comprises the following steps performed based on a storage system: in response to receiving a write request, determining whether the write request meets a preset condition; in response to the write request meeting the preset condition, writing the write request to a storage pool of a hard disk, and assigning a physical block address (PBA) to the write request in the storage pool; generating a first logical block address (LBA) to PBA (LP) request based on the PBA of the write request and an LBA of the write request; and inserting the first LP request into metadata and writing the metadata inserted with the first LP request to the storage pool.

20 Claims, 4 Drawing Sheets

(58) Field of Classification Search
USPC .......................................................... 711/154
See application file for complete search history.

(56) References Cited

U.S. PATENT DOCUMENTS

| | | | | |
|---|---|---|---|---|
| 2019/0087115 | A1* | 3/2019 | Li | G06F 11/1048 |
| 2021/0191880 | A1* | 6/2021 | Ki | G06F 12/1408 |

FOREIGN PATENT DOCUMENTS

| | | | |
|---|---|---|---|
| CN | 113535708 | A | 10/2021 |
| CN | 113867627 | A | 12/2021 |
| CN | 115437579 | A | 12/2022 |

OTHER PUBLICATIONS

International Search Report and Written Opinion received for PCT Application No. PCT/CN2023/082024 mailed on Jul. 10, 2023 (3 pages including English Translation).

* cited by examiner

METHOD OF MANAGING METADATA AND APPARATUS, COMPUTER DEVICE, AND READABLE STORAGE MEDIUM

CROSS-REFERENCE TO RELATED APPLICATION

This application is a National Stage Application of International Application No. PCT/CN2023/082024 filed on Mar. 17, 2023, which claims the benefit of Ser. No. 20/221,1374504.0 filed on Nov. 4, 2022, in China, and which applications are incorporated herein by reference. To the extent appropriate, a claim of priority is made to each of the above disclosed applications.

TECHNICAL FIELD

The present disclosure relates to the technical field of storage, and in particular, to a method of managing metadata and apparatus, a computer device, and a non-volatile readable storage medium.

BACKGROUND

Metadata refers to data about data, and may be understood as data in a broader category than data in a general sense, which not only represents information, such as a type, a name, and a value of the data, but also further provides context information of the data, such as a domain to which the data belongs and a data source. In a data storage system, the metadata is a basis of information storage, and is a smallest unit of data. In recent years, with the development of information technologies, massive data have been generated. How to effectively manage and organize the massive data has become a prominent issue. For a large amount of stored data, the data can be more effectively used by searching and analyzing data content and data meaning in the large amount of stored data. High-efficiency organization and management of the metadata in the storage system is an effective means for solving this problem, which can support management and maintenance of data by the system. Briefly, the data can become more valuable by only effectively managing the metadata. Therefore, how to effectively manage the metadata and use the metadata is a very worthwhile issue to explore.

A back end of a full flash storage system uses a Solid State Disk (SSD) as a storage medium. In view of an issue about the value of the SSD, the full flash storage system requires online data deduplication to reduce actual storage space of a backend disk. To achieve online deduplication of the full flash storage system, metadata management is crucial. The metadata management is mainly to manage a mapping relationship from a Logical Block Address (LBA) to a Physical Block Address (PBA) (an L-P mapping relationship), a mapping relationship from a PBA to a LBA (a P-L mapping relationship), and a mapping relationship from a Hash Key (HK) to a PBA (an H-P mapping relationship). Compared with a conventional characteristic of not supporting online deduplication, the metadata management comprises two types of metadata, namely, P-L mapping and H-P mapping, and a large number of high-concurrency and short-delay data access requests are involved, which brings a greater pressure to the metadata management.

SUMMARY

In view of this, the present disclosure provides a method of managing metadata and apparatus, a computer device, and a non-volatile readable storage medium. Through metadata management, when the performance cannot meet a requirement due to a great data write pressure, partial online deduplication requests for storage systems can be abandoned, and a requirement on the performance of the storage system can be met by reducing deduplicated data.

Based on the above objective, an aspect of embodiments of the present disclosure provides a method of managing metadata, comprising following steps performed based on a storage system:

- in response to receiving a write request, determining whether the write request meets a preset condition;
- in response to the write request meeting the preset condition, writing the write request to a storage pool of a hard disk, and assigning a physical block address (PBA) to the write request in the storage pool;
- generating a first logical block address (LBA) to PBA (LP) request based on the PBA of the write request and an LBA of the write request; and
- inserting the first LP request into metadata and writing the metadata inserted with the first LP request to the storage pool.

In some embodiments, the method further comprising following steps:

- in response to the write request meeting the preset condition, generating a second LP request, a PBA to LBA (PL) request, and a Hash Key (HK) to PBA (HP) request based on the write request; and
- respectively inserting the second LP request, the PL request, and the HP request into respective corresponding metadata, and writing the metadata inserted with the second LP request, the metadata inserted with the PL request, and the metadata inserted with the HP request to the storage pool.

In some embodiments, after determining whether the write request meets a preset condition, the method comprises:

- calculating a target fingerprint value of data corresponding to the write request;
- searching an HP mapping relationship for a target PBA corresponding to the target fingerprint value, wherein H represents a fingerprint value of data, and P represents a PBA in a physical pool; and
- in a case that the physical pool comprises the data corresponding to the write request, which is recorded at the target PBA found, stopping assigning the PBA to the write request in the storage pool.

In some embodiments, the determining whether the write request meets a preset condition comprises:

- determining whether the write request contains continuous LBAs and a quantity of the LBAs reaches a threshold.

In some embodiments, the determining whether the write request contains continuous LBAs and a quantity of the LBAs reaches a threshold comprises:

- determining whether the write request contains continuous LBAs and a quantity of the LBAs reaches 8.

In some embodiments, the in response to the write request meeting the preset condition, writing the write request to a storage pool of a hard disk, and assigning a PBA to the write request in the storage pool comprises:

- in response to that the write request contains the continuous LBAs and the quantity of the LBAs reaches the threshold, writing the write request to the storage pool, and assigning continuous PBAs to the write request in the storage pool based on a grain of the continuous LBAs.

In some embodiments, the generating a first LP request based on the PBA of the write request and an LBA of the write request comprises:

splitting the write request into a corresponding quantity of first LP requests according to the grain of the continuous LBAs, wherein each of the first LP requests contains one LBA and one PBA.

In some embodiments, the determining whether the write request meets to a preset condition comprises:

checking whether an average delay for writing all write requests within a statistical period to the storage pool exceeds a threshold.

In some embodiments, before the checking whether an average delay for writing all write requests within a statistical period to the storage pool exceeds a threshold, the method further comprising:

defining the threshold based on an actual use requirement of a system.

In some embodiments, the checking whether an average delay for writing all write requests within a statistical period to the storage pool exceeds a threshold comprises one of the following:

checking whether an average delay for writing data (the data includes data to be written by the all write requests within a statistical period) within the statistical period to the storage pool exceeds a threshold;

checking whether an average delay for inserting a request (the request includes LP request(s) generated based on a PBA and a LBA of each of the all write requests within a statistical period) within the statistical period to metadata exceeds a threshold; and checking whether an average delay for writing metadata (the metadata includes metadata each piece of which a corresponding LP request is inserted into, wherein above corresponding LP request is a LP request of above LP request(s) generated based on a PBA and a LBA of each of the all write requests within a statistical period; or the metadata includes metadata which above LP request(s) are inserted into) within the statistical period to the storage pool exceeds a threshold.

In some embodiments, after the in response to the write request meeting the preset condition, writing the write request to a storage pool of a hard disk, and assigning a PBA to the write request in the storage pool, the method further comprises:

in response to that the average delay for writing all write requests within the statistical period to the storage pool exceeds the threshold, directly writing a newly received write request to the storage pool, and assigning the PBA to the newly received write request in the storage pool.

In some embodiments, the generating a first LP request based on the PBA of the write request and an LBA of the write request comprises:

splitting the write request into a corresponding quantity of first LP requests, wherein each of the first LP requests contains one LBA and one PBA.

In some embodiments, the in response to the write request meeting the preset condition, generating a second LP request, a PL request, and a HP request based on the write request comprises:

in response to that the write request contains the continuous LBAs and the quantity of the LBAs does not reach the threshold, or the write request does not contain the continuous LBAs, generating the second LP request, the PL request, and the HP request based on the write request.

In some embodiments, after the in response to the write request meeting the preset condition, generating a second LP request, a PL request, and a HP request based on the write request, the method further comprises:

in response to that the average delay for writing all write requests within the statistical period to the storage pool does not exceed the threshold, after newly receiving a write request, generating a second LP request, a PL request, and a HP request based on the newly received write request.

In some embodiments, the method further comprising following steps:

in response to receiving a read request, searching LP metadata for target metadata based on a LBA in the read request, and checking whether the target metadata is correct, wherein the LP metadata comprises multiple metadata, each matadata of the multiple metadata comprises a LP mapping relationship for mapping a LBA to a PBA, the target metadata comprises a target LP mapping relationship for mapping a target LBA to a target PBA, the target LBA is the LBA in the read request;

in response to that the target metadata is correct, returning the target PBA of data stored in the target metadata to the read request; and reading, by the read request, corresponding data in the storage pool based on the target PBA of the data.

In some embodiments, searching LP metadata for target metadata based on a LBA in the read request, and checking whether the target metadata is correct comprises:

accessing a metadata cache, and searching for the target metadata in the metadata cache based on the the target LBA; and in response to that the target metadata is found, checking whether the found target metadata is correct.

In some embodiments, the method further comprising the following steps:

in response to that the target metadata is not found, searching for the target metadata in the storage pool, and checking whether the found target metadata in the storage pool is correct.

Another aspect of the embodiments of the present disclosure further provides a apparatus of metadata management, comprising a determination module, the determination module being configured to: in response to receiving a write request, determine whether the write request meets a preset condition;

a data write module, the data write module being configured to: in response to the write request meeting the preset condition, write the write request to a storage pool of a hard disk, and assign a PBA to the write request in the storage pool;

a generation module, the generation module being configured to generate a first LP request based on the PBA of the write request and an LBA of the write request; and a metadata writing module, the metadata writing module being configured to insert the first LP request into metadata and write the metadata inserted with the first LP request to the storage pool.

Still another aspect of the embodiments of the present disclosure further provides a computer device, comprising at least one processor and a memory. The memory stores a computer program executable on the processor. The computer program implements steps of the following method when executed by the processor:

in response to receiving a write request, determining whether the write request meets a preset condition;

in response to the write request meeting the preset condition, writing the write request to a storage pool of a hard disk, and assigning a physical block address (PBA) to the write request in the storage pool;

generating a first logical block address (LBA) to PBA (LP) request based on the PBA of the write request and an LBA of the write request; and inserting the first LP request into metadata and writing the metadata inserted with the first LP request to the storage pool.

In some embodiments, the method further comprising following steps:

in response to the write request meeting the preset condition, generating a second LP request, a PBA to LBA (PL) request, and a Hash Key (HK) to PBA (HP) request based on the write request; and respectively inserting the second LP request, the PL request, and the HP request into respective corresponding metadata, and writing the metadata inserted with the second LP request, the metadata inserted with the PL request, and the metadata inserted with the HP request to the storage pool.

In some embodiments, after determining whether the write request meets a preset condition, the method comprises:

calculating a target fingerprint value of data corresponding to the write request;

searching an HP mapping relationship for a target PBA corresponding to the target fingerprint value, wherein H represents a fingerprint value of data, and P represents a PBA in a physical pool; and in a case that the physical pool comprises the data corresponding to the write request, which is recorded at the target PBA found, stopping assigning the PBA to the write request in the storage pool.

In some embodiments, the determining whether the write request meets a preset condition comprises:

determining whether the write request contains continuous LBAs and a quantity of the LBAs reaches a threshold.

In some embodiments, the determining whether the write request contains continuous LBAs and a quantity of the LBAs reaches a threshold comprises:

determining whether the write request contains continuous LBAs and a quantity of the LBAs reaches 8.

In some embodiments, the in response to the write request meeting the preset condition, writing the write request to a storage pool of a hard disk, and assigning a PBA to the write request in the storage pool comprises:

in response to that the write request contains the continuous LBAs and the quantity of the LBAs reaches the threshold, writing the write request to the storage pool, and assigning continuous PBAs to the write request in the storage pool based on a grain of the continuous LBAs.

In some embodiments, the generating a first LP request based on the PBA of the write request and an LBA of the write request comprises:

splitting the write request into a corresponding quantity of first LP requests according to the grain of the continuous LBAs, wherein each of the first LP requests contains one LBA and one PBA.

In some embodiments, the determining whether the write request meets to a preset condition comprises:

checking whether an average delay for writing all write requests within a statistical period to the storage pool exceeds a threshold.

In some embodiments, before the checking whether an average delay for writing all write requests within a statistical period to the storage pool exceeds a threshold, further comprising:

defining the threshold based on an actual use requirement of a system.

In some embodiments, the checking whether an average delay for writing all write requests within a statistical period to the storage pool exceeds a threshold comprises one of the following:

checking whether an average delay for writing data within the statistical period to the storage pool exceeds a threshold;

checking whether an average delay for inserting a request within the statistical period to metadata exceeds a threshold; and checking whether an average delay for writing metadata within the statistical period to the storage pool exceeds a threshold.

In some embodiments, after the in response to the write request meeting the preset condition, writing the write request to a storage pool of a hard disk, and assigning a PBA to the write request in the storage pool, the method further comprises:

in response to that the average delay for writing all write requests within the statistical period to the storage pool exceeds the threshold, directly writing a newly received write request to the storage pool, and assigning the PBA to the newly received write request in the storage pool.

In some embodiments, the generating a first LP request based on the PBA of the write request and an LBA of the write request comprises:

splitting the write request into a corresponding quantity of first LP requests, wherein each of the first LP requests contains one LBA and one PBA.

In some embodiments, the in response to the write request meeting the preset condition, generating a second LP request, a PL request, and a HP request based on the write request comprises:

in response to that the write request contains the continuous LBAs and the quantity of the LBAs does not reach the threshold, or the write request does not contain the continuous LBAs, generating the second LP request, the PL request, and the HP request based on the write request.

In some embodiments, after the in response to the write request meeting the preset condition, generating a second LP request, a PL request, and a HP request based on the write request, the method further comprises:

in response to that the average delay for writing all write requests within the statistical period to the storage pool does not exceed the threshold, after newly receiving a write request, generating a second LP request, a PL request, and a HP request based on the newly received write request.

In some embodiments, the method further comprising following steps:

in response to receiving a read request, searching LP metadata for target metadata based on a LBA in the read request, and checking whether the target metadata is correct, wherein the LP metadata comprises multiple metadata, each matadata of the multiple metadata comprises a LP mapping relationship for mapping a LBA to a PBA, the target metadata comprises a target LP mapping relationship for mapping a target LBA to a target PBA, the target LBA is the LBA in the read request;

in response to that the target metadata is correct, returning the target PBA of data stored in the target metadata to the read request; and reading, by the read request, corresponding data in the storage pool based on the target PBA of the data.

In some embodiments, searching LP metadata for target metadata based on a LBA in the read request, and checking whether the target metadata is correct comprises:

accessing a metadata cache, and searching for the target metadata in the metadata cache based on the the target LBA; and in response to that the target metadata is found, checking whether the found target metadata is correct.

In some embodiments, the method further comprising the following steps:

in response to that the target metadata is not found, searching for the target metadata in the storage pool, and checking whether the found target metadata in the storage pool is correct.

Yet another aspect of the embodiments of the present disclosure further provides a computer non-volatile readable storage medium. The computer non-volatile readable storage medium stores a computer program that implements steps of the above method when executed by a processor.

The present disclosure at least has the following beneficial technical effects: through a solution that in response to receiving a write request, whether the write request meets a preset condition is determined; in response to the write request meeting the preset condition, the write request is written to a storage pool of a hard disk, and a PBA is assigned to the write request in the storage pool; a first LP request is generated based on the PBA of the write request and an LBA of the write request; and the first LP request is inserted into metadata, and the metadata inserted with the first LP request is wrote to the storage pool, when a large number of high-concurrency and short-delay data access requests are involved, the amount of tasks of the metadata can be reduced, and the performance of the storage system can be improved.

BRIEF DESCRIPTION OF THE DRAWINGS

To illustrate the embodiments of the present disclosure or the technical solutions in the conventional art more clearly, the drawings that need to be used in the description of the embodiments or the conventional art will be briefly described below. It is apparent that the drawings in the following description are only some embodiments of the present disclosure, and other drawings can be obtained by those skilled in the art according to these drawings without any creative work.

DETAILED DESCRIPTION OF THE EMBODIMENTS

To make the purposes, technical solutions, and advantages of the present disclosure clearer, the embodiments of the present disclosure will be further described in detail below with reference to specific embodiments and the drawings.

It is to be noted that, all expressions using "first" and "second" in the embodiments of the present disclosure are for the purpose of distinguishing two non-identical entities with the same name or non-identical parameters. It may be seen that "first" and "second" are only for the convenience of expression, and should not be construed as a limitation to the embodiments of the present disclosure, which are not described one by one thereto in the subsequent embodiments.

Figure 1:
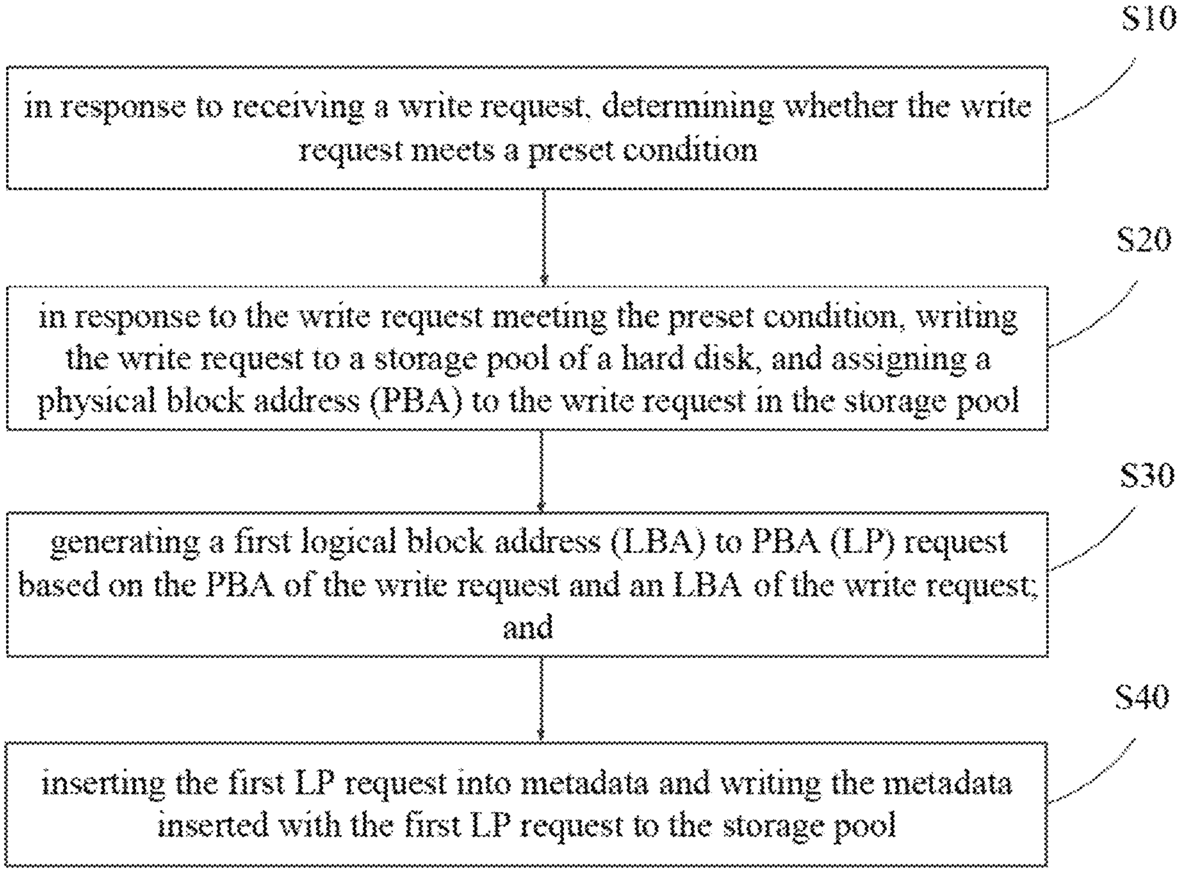
FIG. 1 is a flowchart of an embodiment of a method of managing metadata according to some embodiments of the present disclosure.

Based on the above objective, a first aspect of the embodiments of the present disclosure provides an embodiment of a method of managing metadata. As shown in FIG. 1, the following steps are performed based on a storage system.

In S10, in response to receiving a write request, determining whether the write request meets a preset condition.

In S20, in response to the write request meeting the preset condition, writing the write request to a storage pool of a hard disk, and assigning a physical block address (PBA) to the write request in the storage pool.

In S30, generating a first logical block address (LBA) to PBA (LP) request based on the PBA of the write request and an LBA of the write request; and In S40, inserting the first LP request into metadata and writing the metadata inserted with the first LP request to the storage pool.

Metadata management mainly manages an LP mapping relationship, a PL mapping relationship, an HP mapping relationship, which respectively corresponds to an LP tree, a PL tree, and an HP tree. The LP tree is a mapping organization of L-P, is mainly used for mapping an LBA of a volume to a PBA of a physical pool, and is used for a user host to read and write and recycle and use garbage of non-deduplicated data. The PL tress is a mapping organization of P-L, is mainly used for mapping a PBA of a pool to an LBA of the volume, and is used for garbage recycling and search whether the PBA is stilled used. The HP tree is a mapping organization of H-P (namely, an HP mapping relationship), is used for a deduplication module to use. HASHKEY (H) represents a fingerprint data of data, and the HP tree is mainly used for mapping a data fingerprint to the PBA of the pool. When a deduplication function is started, a fingerprint value of the newly written data is calculated first, and then the HP mapping is queried. If the P representing there are the same data in the physical pool is queried, the PBA does not need to be assigned.

The storage system of this embodiment may be a full flash storage system. Compared with a storage system that does not support a characteristic of deduplication, the metadata management comprises two types of metadata, namely, P-L mapping and H-P mapping, and a large number of high-concurrency and short-delay data access requests are involved, which brings a greater pressure to the metadata management. According to the embodiments of the present disclosure, a non-deduplication process is triggered in a state that a write request is determined in response to receiving the write request, and a great write pressure of a storage system will be caused by the write request, or it is determined that the current storage system has a great pressure in processing write, that is, data in the write request is written to a storage pool of a hard disk, a PBA is assigned to written data in the storage pool, an LP request (also referred to as an LP mapping relationship) is generated based on the PBA assigned to the data and the LBA in the write request corresponding to the data, the generated LP request is inserted into the metadata, and the metadata inserted with the LP request are wrote to the storage pool. Through the above solution, when a large number of high-concurrency and short-delay data access requests are involved, the number of tasks of the metadata can be reduced, and the performance of the storage system can be improved.

In some embodiments, the method further comprises the following steps.

- in response to the write request meeting the preset condition, generating a second LP request, a PBA to LBA (PL) request, and a Hash Key (HK) to PBA (HP) request based on the write request; and
- respectively inserting the second LP request, the PL request, and the HP request into respective corresponding metadata, and writing the metadata inserted with the second LP request, the metadata inserted with the PL request, and the metadata inserted with the HP request to the storage pool.

In some embodiments, the determining whether the write request meets a preset condition comprises:

- determining whether the write request contains continuous LBAs and a quantity of the LBAs reaches a threshold.

In some embodiments, the in response to the write request meeting the preset condition, writing the write request to a storage pool of a hard disk, and assigning a PBA to the write request in the storage pool comprises:

- in response to that the write request contains the continuous LBAs and the quantity of the LBAs reaches the threshold, writing the write request to the storage pool, and assigning continuous PBAs to the write request in the storage pool based on a grain of the continuous LBAs.

In some embodiments, the generating a first LP request based on the PBA of the write request and an LBA of the write request comprises:

- splitting the write request into a corresponding quantity of first LP requests according to the grain of the continuous LBAs, wherein each of the first LP requests contains one LBA and one PBA.

Figure 2:
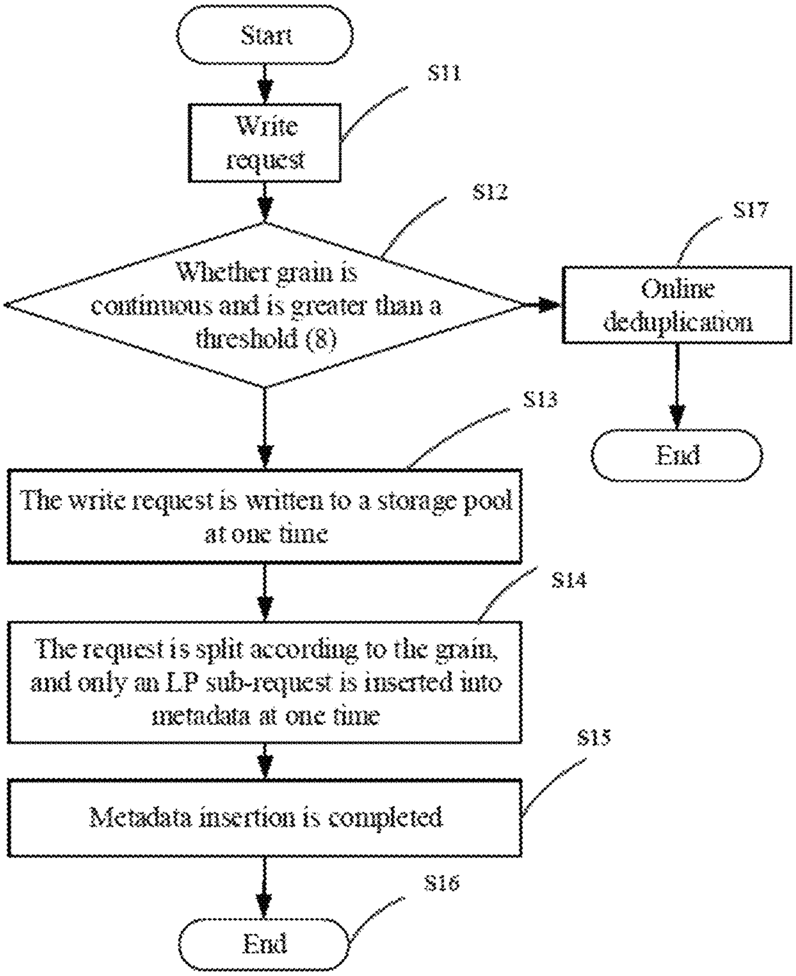
FIG. 2 is a flowchart of another embodiment of a method of managing metadata according to some embodiments of the present disclosure.

In an embodiment, FIG. 2 is a flowchart of metadata management in an application scenario where a write request contains LBAs with continuous grain. The following steps are comprised:

In S11, a write request of a host is received.

In S12, whether the request comprises LBAs with continuous grain, and a quantity of continuous LBAs reaches a threshold (for example, 8) are checked. If yes, S13 is performed, and if no, S17 is performed.

In S13, the write request that contains the LBAs with the continuous grain into a storage pool at one time. The storage pool assigns continuous PBAs to the write request according to the grain.

In S14, the write request is split according to the grain to generate a corresponding quantity of LP requests. Moreover, only the LP request is generated, and each LP request is inserted into corresponding metadata.

In S15, after the operation that the LP request is inserted into the metadata is completed, the metadata that contains the LP request (called LP metadata for short) are wrote to the storage pool.

In S16, the write request is returned to an upper layer, and a writing process is completed.

In S17, an online deduplication process is entered, an LP request, a PL request, an HP request are generated and are respectively inserted into the metadata, and the metadata inserted with the LP request, the metadata inserted with the PL request, and the metadata inserted with the HP request are wrote to the storage pool.

According to the solution above, when a large number of high-concurrency data access requests are involved, the concurrency of access is improved, high data access efficiency is achieved, and the number of tasks of the metadata is reduced, and the performance of a storage system is improved.

In some embodiments, the determining whether the write request meets to a preset condition comprises:

- checking whether an average delay for writing all write requests within a statistical period to the storage pool exceeds a threshold.

In some embodiments, after the in response to the write request meeting the preset condition, writing the write request to a storage pool of a hard disk, and assigning a PBA to the write request in the storage pool, the method further comprises:

- in response to that the average delay for writing all write requests within the statistical period to the storage pool exceeds the threshold, directly writing a newly received write request to the storage pool, and assigning the PBA to the newly received write request in the storage pool.

In some embodiments, the in response to the write request meeting the preset condition, generating a second LP request, a PL request, and a HP request based on the write request comprises:

- in response to that the write request contains the continuous LBAs and the quantity of the LBAs does not reach the threshold, or the write request does not contain the continuous LBAs, generating the second LP request, the PL request, and the HP request based on the write request.

In some embodiments, after the in response to the write request meeting the preset condition, generating a second LP request, a PL request, and a HP request based on the write request, the method further comprises:

- in response to that the average delay for writing all write requests within the statistical period to the storage pool does not exceed the threshold, after newly receiving a write request, generating a second LP request, a PL request, and a HP request based on the newly received write request.

Figure 3:
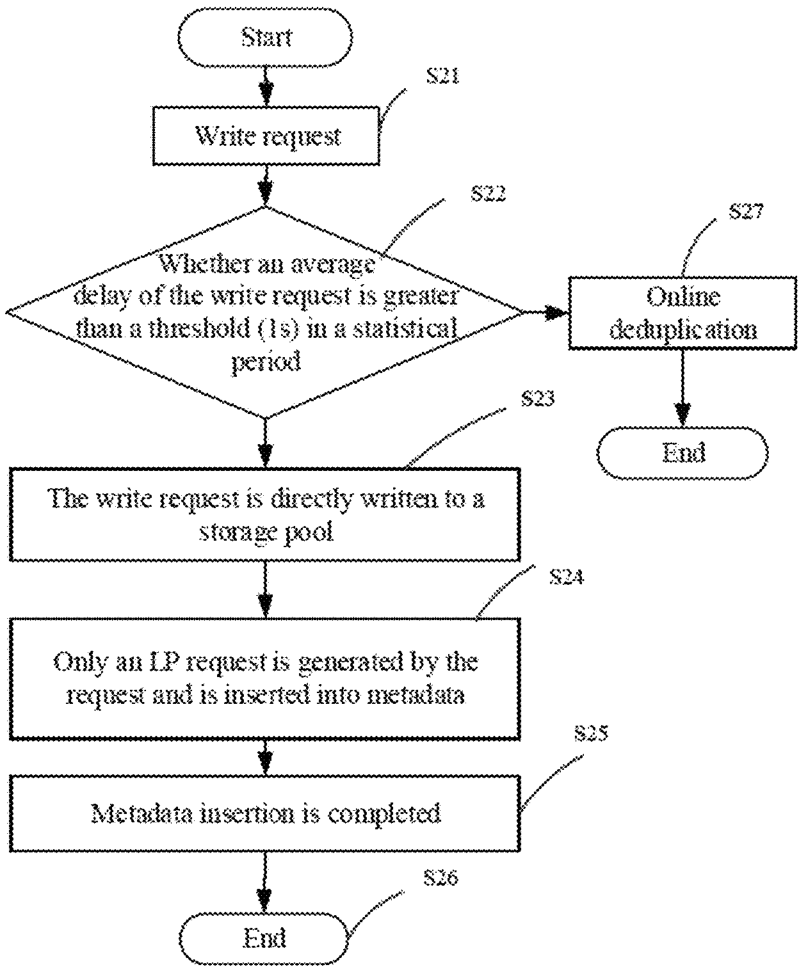
FIG. 3 is a flowchart of still another embodiment of a method of managing metadata according to some embodiments of the present disclosure.

In an embodiment, FIG. 3 is a flowchart of metadata management in an application scenario where a delay for flushing (namely, writing) a write request to a storage pool is large. The following steps are comprised.

In S21, a write request of a host reaches a storage system.

In S22, whether a delay that the write request reaches a storage pool satisfies a threshold is checked in a statistical period. If the delay that the write request reaches the storage pool does not satisfy the threshold in a statistical period, S23 is performed. If the delay that the write request reaches the storage pool satisfies the threshold in the statistical period, S27 is performed. The threshold is self-defined by a user based on an actual use requirement of the system. The delay comprises a delay for writing the data to the storage pool, a delay for inserting the request to the metadata, and a delay for flushing the metadata to the storage pool. The request that is inserted into the metadata refers to an LP request, a PL request, and an HP request.

In S23, the write request is written to the storage pool, and a PBA is assigned to the written write request in the storage pool.

In S24, only the LP request is generated and is inserted into the metadata.

In S25, after the operation that the LP request is inserted into the metadata is completed, the metadata that contains the LP is wrote to the storage pool.

In S26, the write request is returned to an upper layer, and a writing process is completed.

In S27, an online deduplication process is entered, an LP request, a PL request, an HP request are generated and are respectively inserted into the metadata, and the metadata inserted with the LP request, the metadata inserted with the PL request, and the metadata inserted with the HP request are wrote to the storage pool.

According to the solution above, in a scenario where a data access delay is large, the number of tasks of the metadata are reduced, and the performance of a storage system is improved.

According to the embodiments of the present disclosure, part online deduplication will be abandoned to meet a requirement for service performance, a non-deduplication process is performed, the number of tasks of the metadata is reduced, and the performance of a storage system is improved. When a plurality of data blocks with continuous grain appear, or a delay for inserting a request to metadata exceeds a threshold, online deduplication of part metadata will be abandoned in this two cases to meet the requirement for the performance of the storage system. By the method, not only the requirement for the performance of online deduplication can be met, but also the overall deduplication rate of the system can be met, which is efficient and accurate. Moreover, the concurrency of access can be improved, and efficient data access can be achieved.

In some embodiments, the method further comprises the following steps.

in response to receiving a read request, searching LP metadata for target metadata based on a LBA in the read request, and checking whether the target metadata is correct, wherein the LP metadata comprises multiple metadata, each matadata of the multiple metadata comprises a LP mapping relationship for mapping a LBA to a PBA, the target metadata comprises a target LP mapping relationship for mapping a target LBA to a target PBA, the target LBA is the LBA in the read request;

in response to that the target metadata is correct, returning the target PBA of data stored in the target metadata to the read request; and reading, by the read request, corresponding data in the storage pool based on the target PBA of the data.

In some embodiments, searching LP metadata for target metadata based on a LBA in the read request, and checking whether the target metadata is correct comprises:

accessing a metadata cache, and searching for the target metadata in the metadata cache based on the the target LBA; and in response to that the target metadata is found, checking whether the found target metadata is correct.

In some embodiments, the method further comprises the following steps.

in response to that the target metadata is not found, searching for the target metadata in the storage pool, and checking whether the found target metadata in the storage pool is correct.

Figure 4:
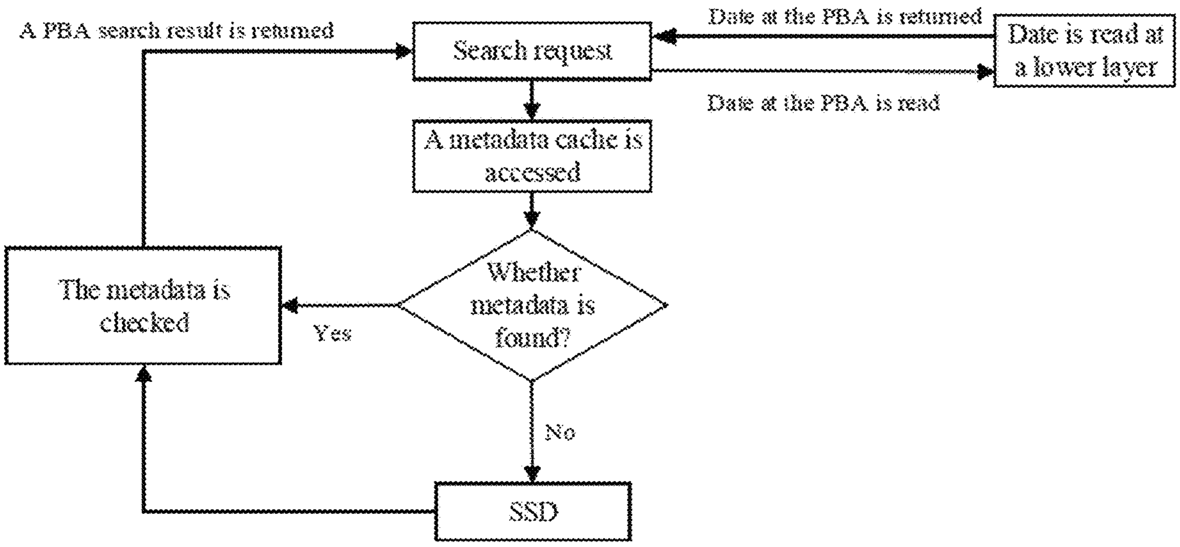
FIG. 4 is a flowchart of an embodiment of a method of metadate access according to some embodiments of the present disclosure.

In an embodiment, FIG. 4 is a metadata access flowchart. A process is as follows.

A data search request (that is, a read request) needs to search data. Metadata is queried first to find an L→P mapping relationship. First, a metadata cache is accessed first. If corresponding metadata is found in the cache, the metadata is directly returned to the search request after being checked. If the corresponding metadata is not found in the cache, the metadata is accessed on an SSD and then is returned to the search request, and finally, the search request accesses the corresponding data based on the PBA of the data stored in the metadata.

Figure 5:
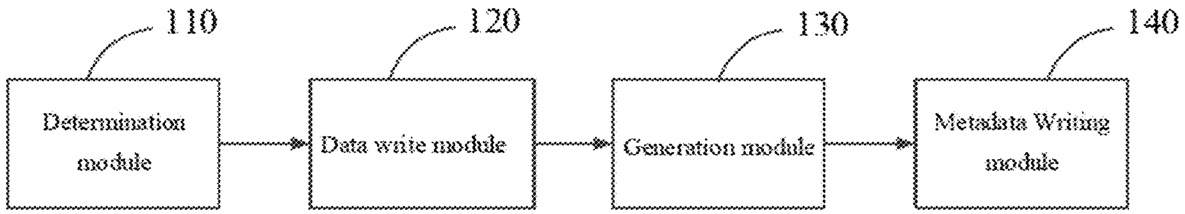
FIG. 5 is a schematic diagram of an embodiment of a apparatus of metadata management according to some embodiments of the present disclosure.

Based on the same application concept, according to another aspect of the present disclosure, as shown in FIG. 5, the embodiments of the present disclosure further provide a apparatus of metadata management, comprising a determination module 110, a data write module 120, a generation module 130, and a metadata writing module 140.

The determination module 110 is configured to determine whether the write request meets a preset condition in response to receiving a write request.

The data write module 120 is configured to write the write request to a storage pool of a hard disk, and assigning a physical block address (PBA) to the write request in the storage pool in response to the write request meeting the preset condition,.

The generation module 130 is configured to generate a first logical block address (LBA) to PBA (LP) request based on the PBA of the write request and an LBA of the write request; and The metadata writing module 140 is configured to insert the first LP request into metadata and writing the metadata inserted with the first LP request to the storage pool.

Figure 6:
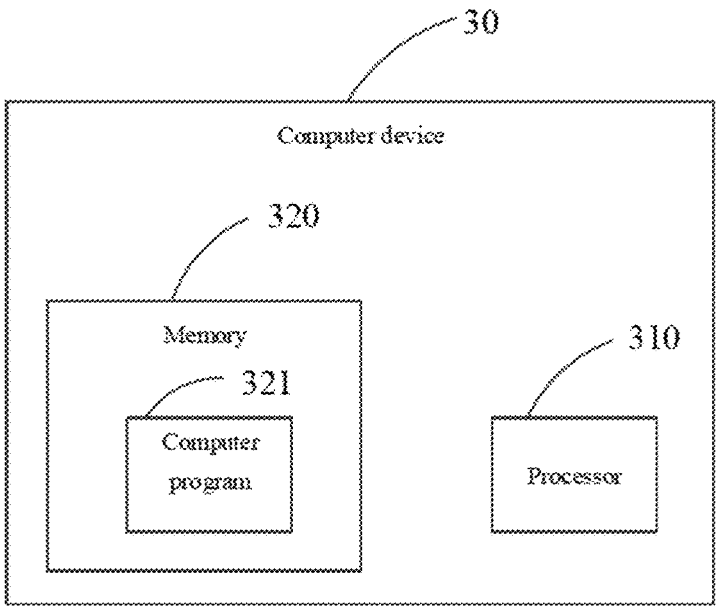
FIG. 6 is a schematic structural diagram of an embodiment of a computer device according to some embodiments of the present disclosure.

Based on the same application concept, according to another aspect of the present disclosure, as shown in FIG. 6, the embodiments of the present disclosure further provide a computer device 30. The computer device 30 comprises a processor 310 and a memory 320. The memory 320 stores a computer program 321 executable on the processor. The processor 310 performs steps of the method as described above when executing the program.

The memory, as a non-volatile readable storage medium of a non-volatile computer, may be configured to store non-volatile software programs, non-volatile computer-executable programs, and modules, for example, program instructions/modules corresponding to the method of managing metadata according to the embodiments of the present disclosure. The processor executes various functional applications and data processing of an apparatus by executing the non-volatile software programs, instructions and modules stored in the memory, that is, implementing the method of managing metadata according to the above method embodiments.

The memory may comprise a program storage area and a data storage area. The program storage area may store applications required by an operating apparatus and at least one function. The data storage area may store data created according to the use of the apparatus, and the like. In addition, the memory may comprise a high-speed random access memory, and may further comprise a non-volatile memory, for example, at least one magnetic disk storage device, a flash memory device, or other non-volatile solid-state storage devices. In some embodiments, the memory optionally comprises memories remotely located relative to the processor. These remote memories may be connected to a local module through a network. Examples of the above network comprise, but are not limited to, the Internet, the Intranet, a local area network, a mobile communication network, and combinations thereof.

In one or more exemplary designs, functions may be realized in hardware, software, firmware, or any combination thereof. If the functions are realized in the software, the functions may be stored on the computer non-volatile readable medium as one or more instructions or codes or be transferred by means of the computer non-volatile readable medium. The computer non-volatile readable medium comprises a computer storage medium and a communication medium. The communication medium comprises any medium that facilitates transmitting a computer program from one position to another position. The storage medium may be any available medium that can be accessed by a general or special-purpose computer. As an example but not a limitation, the computer non-volatile readable medium may comprise a Random Access Memory (RAM), a Read-Only Memory (ROM), an Electrically Erasable Programmable Read Only Memory (EEPROM), Compact Disc Read Only Memory (CD-ROM) or other optical disk storage devices, magnetic disk storage devices or other magnetic storage devices, or may be any other media that are configured to carry or store required program codes in the form of instructions or data structures and that can be accessed by a general or special-purpose computer or a general or special-purpose processor. In addition, any connection may properly be called a computer non-volatile readable medium. For example, if a coaxial cable, a fiber optic cable, a twisted pair, a Digital Subscriber Line (DSL), or wireless technologies such as infrared, radio, and microwave are used to transmit software from a website, a server, or other remote sources, then the above coaxial cable, the fiber optic cable, the twisted pair, the DSL, or the wireless technologies such as the infrared, the radio, and the microwave are all comprised in the definition of the medium. As used herein, the magnetic disk and the optical disk comprise Compact Disks (CDs), laser disks, optical disks, Digital Versatile Disks (DVDs), floppy disks, Blu-ray disks, and the disks usually reproduce data magnetically, while the optical disks reproduce data optically with lasers. Combinations of the above should also be comprised within the scope of the computer-readable medium. Combinations of the above content are also to be comprised within the scope of a computer non-volatile readable storage medium.

Figure 7:
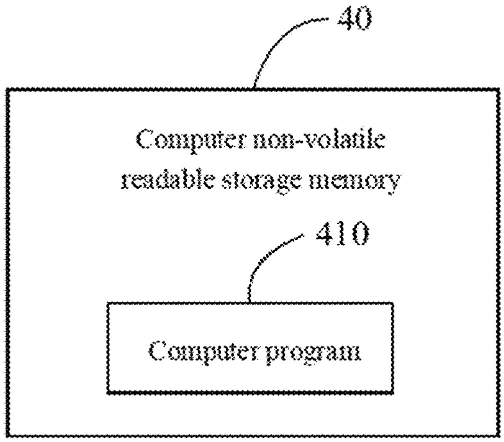
FIG. 7 is a schematic structural diagram of an embodiment of a computer non-volatile readable storage medium according to some embodiments of the present disclosure.

Based on the same application concept, according to another aspect of the present disclosure, as shown in FIG. 7, the embodiments of the present disclosure further provide a computer non-volatile readable storage medium 40. The computer non-volatile readable storage medium 40 stores a computer program 410 for performing the above method when executed by the processor.

It is finally to be noted that, those of ordinary skill in the art may understand that all or part of the processes in the foregoing method embodiments may be completed by a computer program instructing related hardware, and the program may be stored in a computer non-volatile readable storage medium. When the program is executed, the processes of the embodiments of various methods as described may be comprised. The storage medium for the program may be a disk, an optical disk, a ROM, or a RAM. The abovementioned embodiment of the computer program may achieve the same or similar effects as any foregoing method embodiment corresponding thereto.

Those skilled in the art will also appreciate that various exemplary logical blocks, modules, circuits, and algorithm steps described in combination with the disclosure herein may be implemented as electronic hardware, computer software, or a combination of the electronic hardware and the computer software. To clearly describe such interchangeability of hardware and software, various illustrative components, blocks, modules, circuits, and steps have been described generally in terms of their functionality. Whether such functions are implemented as software or hardware depends on specific applications and design constraints imposed on the entire apparatus. Those skilled in the art may implement functions in various modes for each specific application, but such implementation decisions are not to be interpreted as departing from the scope disclosed in the embodiments of the present disclosure.

The above are exemplary embodiments of the present disclosure, but it is to be noted that, various changes and modifications may be made without departing from the scope disclosed in the embodiments of the present disclosure as defined in the claims. The functions, steps and/or actions of the method claims in accordance with the disclosed embodiments described herein need not be performed in any order. Serial numbers in the embodiments disclosed in the foregoing embodiments of the present disclosure are merely for description, and do not represent the superiority or inferiority of the embodiments. In addition, although elements disclosed in the embodiments of the present disclosure may be described or claimed in an individual form, unless explicitly limited to a singular form, the elements may also be understood as a plural form.

It is to be understood that, as used herein, the singular form "a" is intended to comprise the plural form as well, unless the context clearly supports an exception. It is also be understood that, "and/or" as used herein is meant to comprise any and all possible combinations of one or more of the associated listed items.

Those of ordinary skill in the art will understand that the discussion of any of the embodiments above is merely exemplary, and is not intended to imply that the scope (comprising the claims) disclosed in the embodiments of the present disclosure is limited to these examples. Under the idea of the embodiments of the present disclosure, the technical features in the above embodiments or different embodiments can also be combined. In addition, there are many other changes in different aspects of the embodiments of the present disclosure above, which are not provided in detail for the sake of brevity. Therefore, any omissions, modifications, equivalent replacements, improvements and the like made within the spirit and principle of the embodiments of the present disclosure fall within the protection scope of the embodiments of the present disclosure.

What is claimed is:

1. A method of managing metadata, comprising following steps performed based on a storage system:

in response to receiving a write request, determining whether the write request meets a preset condition;

in response to the write request meeting the preset condition, writing the write request to a storage pool of a hard disk, and assigning a physical block address (PBA) to the write request in the storage pool;

generating a first logical block address (LBA) to PBA (LP) request based on the PBA of the write request and an LBA of the write request; and inserting the first LP request into metadata and writing the metadata inserted with the first LP request to the storage pool.

2. The method according to claim 1, further comprising following steps:

in response to the write request meeting the preset condition, generating a second LP request, a PBA to LBA (PL) request, and a Hash Key (HK) to PBA (HP) request based on the write request; and respectively inserting the second LP request, the PL request, and the HP request into respective corresponding metadata, and writing the metadata inserted with the second LP request, the metadata inserted with the PL request, and the metadata inserted with the HP request to the storage pool.

3. The method according to claim 2, wherein after determining whether the write request meets a preset condition, the method comprises:

calculating a target fingerprint value of data corresponding to the write request;

searching an HP mapping relationship for a target PBA corresponding to the target fingerprint value, wherein H represents a fingerprint value of data, and P represents a PBA in a physical pool; and in a case that the physical pool comprises the data corresponding to the write request, which is recorded at the target PBA found stopping assigning the PBA to the write request in the storage pool.

4. The method according to claim 2, wherein the determining whether the write request meets a preset condition comprises:

determining whether the write request contains continuous LBAs and a quantity of the LBAs reaches a threshold.

5. The method according to claim 4, wherein the determining whether the write request contains continuous LBAs and a quantity of the LBAs reaches a threshold comprises:

determining whether the write request contains continuous LBAs and a quantity of the LBAs reaches 8.

6. The method according to claim 4, wherein the in response to the write request meeting the preset condition, writing the write request to a storage pool of a hard disk, and assigning a PBA to the write request in the storage pool comprises:

in response to that the write request contains the continuous LBAs and the quantity of the LBAs reaches the threshold, writing the write request to the storage pool, and assigning continuous PBAs to the write request in the storage pool based on a grain of the continuous LBAs.

7. The method according to claim 6, wherein the generating a first LP request based on the PBA of the write request and an LBA of the write request comprises:

splitting the write request into a corresponding quantity of first LP requests according to the grain of the continuous LBAs, wherein each of the first LP requests contains one LBA and one PBA.

8. The method according to claim 2, wherein the determining whether the write request meets to a preset condition comprises:

checking whether an average delay for writing all write requests within a statistical period to the storage pool exceeds a threshold.

9. The method according to claim 8, before the checking whether an average delay for writing all write requests within a statistical period to the storage pool exceeds a threshold, further comprising:

defining the threshold based on an actual use requirement of a system.

10. The method according to claim 8, wherein the checking whether an average delay for writing all write requests within a statistical period to the storage pool exceeds a threshold comprises one of the following:

checking whether an average delay for writing data within the statistical period to the storage pool exceeds a threshold;

checking whether an average delay for inserting a request within the statistical period to metadata exceeds a threshold; and checking whether an average delay for writing metadata within the statistical period to the storage pool exceeds a threshold.

11. The method according to claim 8, wherein after the in response to the write request meeting the preset condition, writing the write request to a storage pool of a hard disk, and assigning a PBA to the write request in the storage pool, the method further comprises:

in response to that the average delay for writing all write requests within the statistical period to the storage pool exceeds the threshold, directly writing a newly received write request to the storage pool, and assigning the PBA to the newly received write request in the storage pool.

12. The method according to claim 11, wherein the generating a first LP request based on the PBA of the write request and an LBA of the write request comprises:

splitting the write request into a corresponding quantity of first LP requests, wherein each of the first LP requests contains one LBA and one PBA.

13. The method according to claim 4, wherein the in response to the write request meeting the preset condition, generating a second LP request, a PL request, and a HP request based on the write request comprises:

in response to that the write request contains the continuous LBAs and the quantity of the LBAs does not reach the threshold, or the write request does not contain the continuous LBAs, generating the second LP request, the PL request, and the HP request based on the write request.

14. The method according to claim 8, wherein after the in response to the write request meeting the preset condition, generating a second LP request, a PL request, and a HP request based on the write request, the method further comprises:

in response to that the average delay for writing all write requests within the statistical period to the storage pool does not exceed the threshold, after newly receiving a write request, generating a second LP request, a PL request, and a HP request based on the newly received write request.

15. The method according to claim 1, further comprising following steps:

in response to receiving a read request, searching LP metadata for target metadata based on a LBA in the read request, and checking whether the target metadata is correct, wherein the LP metadata comprises multiple metadata, each matadata of the multiple metadata comprises a LP mapping relationship for mapping a LBA to a PBA, the target metadata comprises a target LP mapping relationship for mapping a target LBA to a target PBA, the target LBA is the LBA in the read request;

in response to that the target metadata is correct, returning the target PBA of data stored in the target metadata to the read request; and reading, by the read request, corresponding data in the storage pool based on the target PBA of the data.

16. The method according to claim 15, wherein searching LP metadata for target metadata based on a LBA in the read request, and checking whether the target metadata is correct comprises:

accessing a metadata cache, and searching for the target metadata in the metadata cache based on the target LBA; and in response to that the target metadata is found, checking whether the found target metadata is correct.

17. The method according to claim 16, further comprising the following steps:

in response to that the target metadata is not found, searching for the target metadata in the storage pool, and checking whether the found target metadata in the storage pool is correct.

18. A computer device, comprising:

at least one processor; and a memory, the memory storing a computer program executable on the processor, wherein the processor performs steps of the method according to claim 1 when executing the program.

19. A computer non-volatile readable storage medium, the computer non-volatile readable storage medium storing a computer program, wherein the computer program performs steps of the method according to claim 1 when executed by the processor.

20. A computer device, comprising:

at least one processor; and a memory, the memory storing a computer program executable on the processor, wherein the processor performs steps of the method according to claim 2 when executing the program.

* * * * *